United States Patent [19]
Miller

[11] Patent Number: 5,931,440
[45] Date of Patent: Aug. 3, 1999

[54] REGULATED ATTACHMENT FOR MIRROR MOUNT

[75] Inventor: Jeffrey A. Miller, Holland, Mich.

[73] Assignee: Gentex Corporation, Zeeland, Mich.

[21] Appl. No.: 08/742,863

[22] Filed: Nov. 1, 1996

[51] Int. Cl.[6] .................................................. F16M 13/00
[52] U.S. Cl. ........................................ 248/549; 248/900
[58] Field of Search ................................ 248/475.1, 478,
248/480, 483, 487, 476, 481, 223.31, 224.8,
222.11, 549, 224.51, 224.61, 548, 900;
359/871, 872

[56] References Cited

U.S. PATENT DOCUMENTS

| | | | |
|---|---|---|---|
| 4,254,931 | 3/1981 | Aikens et al. | 248/549 |
| 4,936,533 | 6/1990 | Adams et al. | 248/222.1 |
| 5,377,948 | 1/1995 | Suman et al. | 248/549 |

*Primary Examiner*—Ramon O. Ramirez
*Assistant Examiner*—Gwendolyn Baxter
*Attorney, Agent, or Firm*—Flynn, Thiel, Boutell & Tanis, P.C.

[57] ABSTRACT

A regulated attachment for mounting a rearview mirror to a button having a surface thereon secured to a surface of a vehicle windshield. The button has lateral side surfaces facing away from each other and toward the windshield to define a groove therewith. The bracket includes a body member having a rearview mirror supporting structure thereon and a mounting for a spring clip. The spring clip includes side walls for gripping and securing the body member to the button. The spring clip further includes an elongated base portion and longitudinally extending and laterally spaced resilient side flanges projecting from the base portion and away from the body member. Each of the side flanges extend parallel to a respective side surface and define a tongue adapted to be slidably received in a corresponding one of the grooves in a tongue and groove fashion. The mounting structure for facilitating a connection of the spring clip to the bracket includes structure for loosely retaining the spring clip on the bracket so that the side flanges thereof are free to seek a parallel aligned orientation and full engagement with the side surfaces of the button in response to the body member moving relative to the button in an assembly direction to apposition overlying the button. A manually activated tightening device is provided for forcible drawing the spring clip a regulated distance toward the body member to cause the side flanges to each be forcibly urged into tight engagement with the side surfaces of the button while maintaining the tongue and groove relationship therebetween as well as providing securement of the body member to the button.

12 Claims, 13 Drawing Sheets

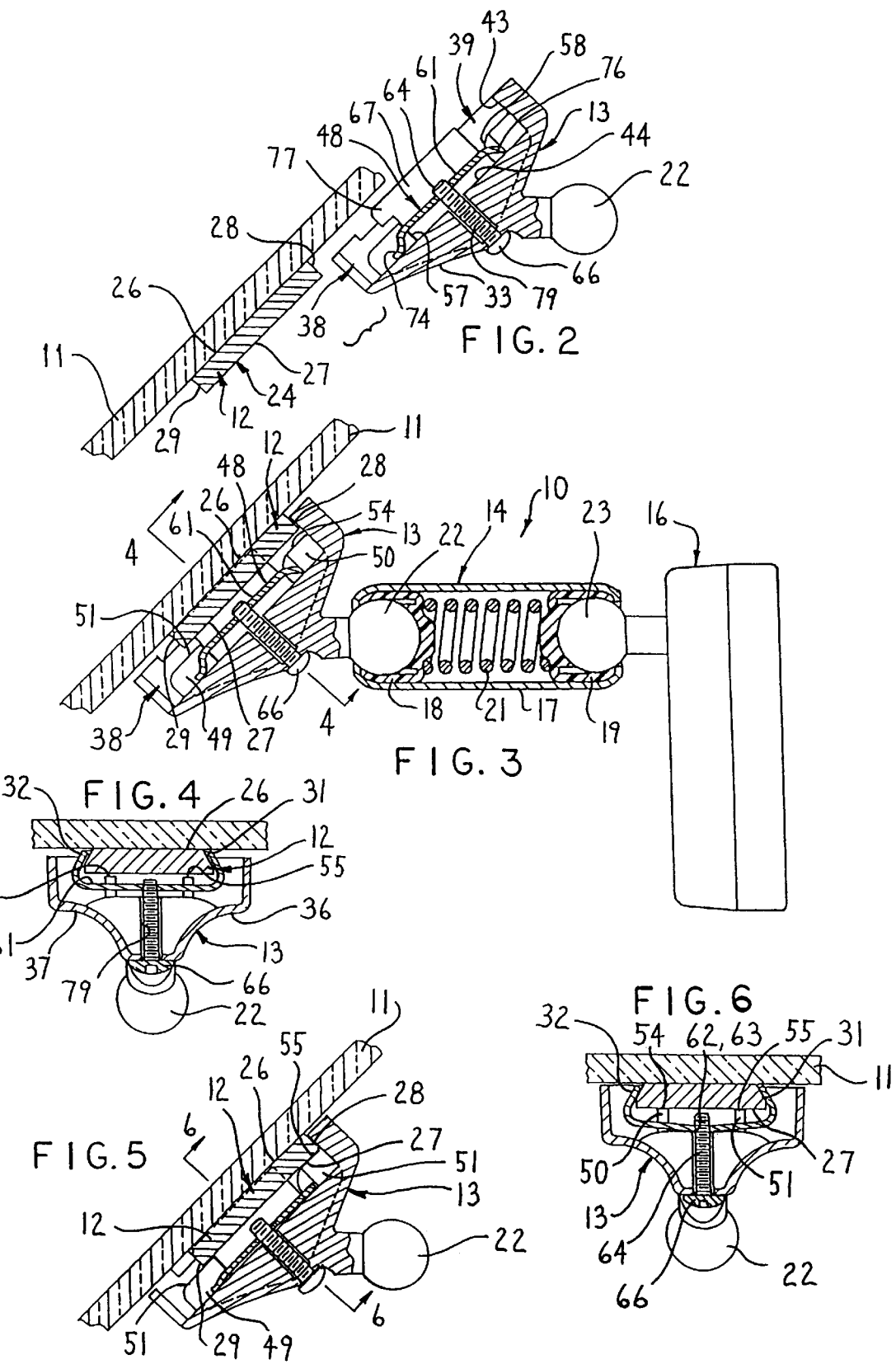

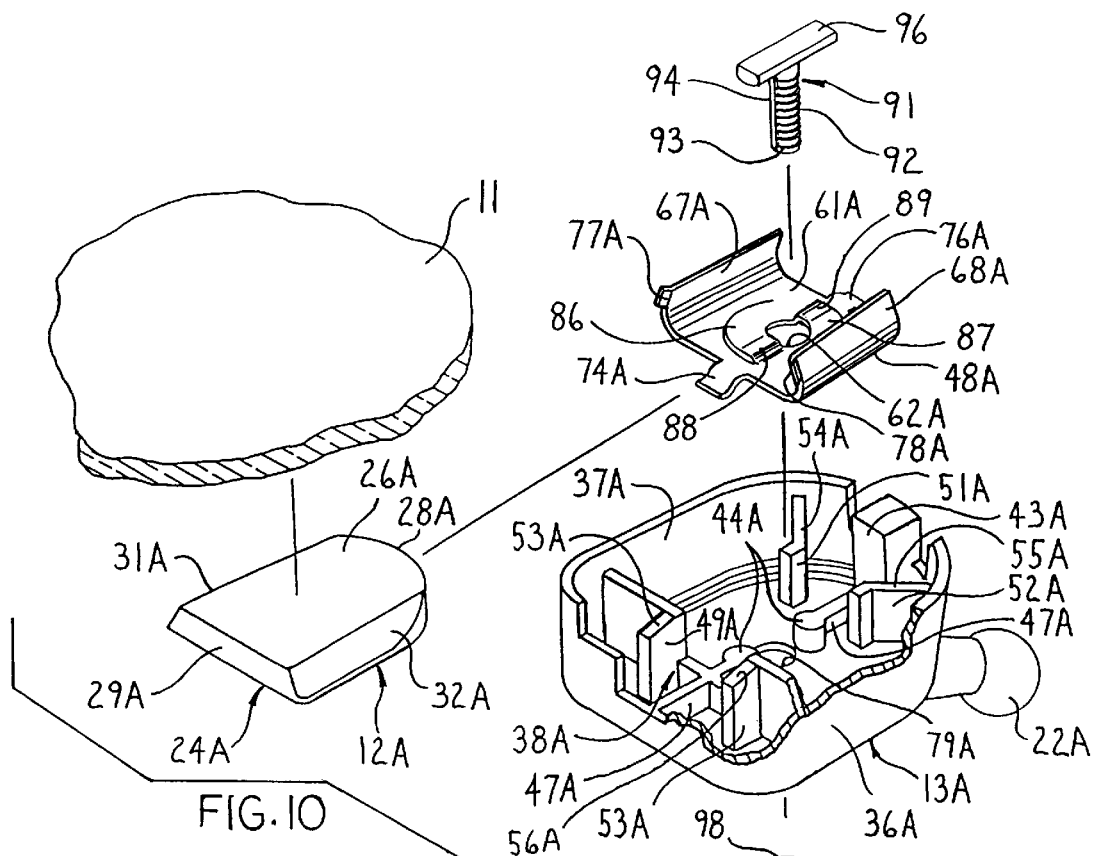
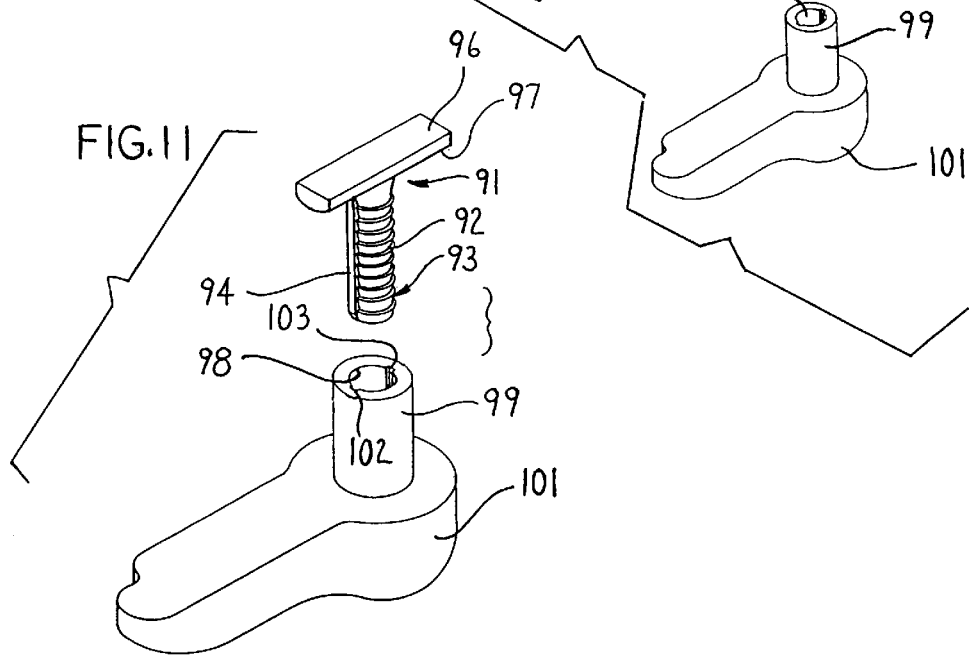

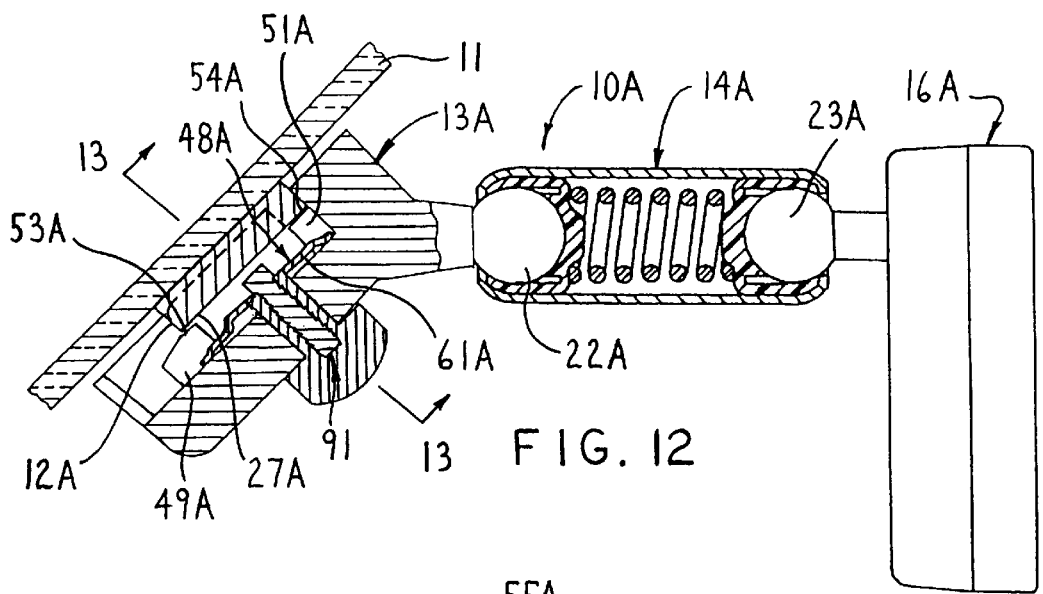
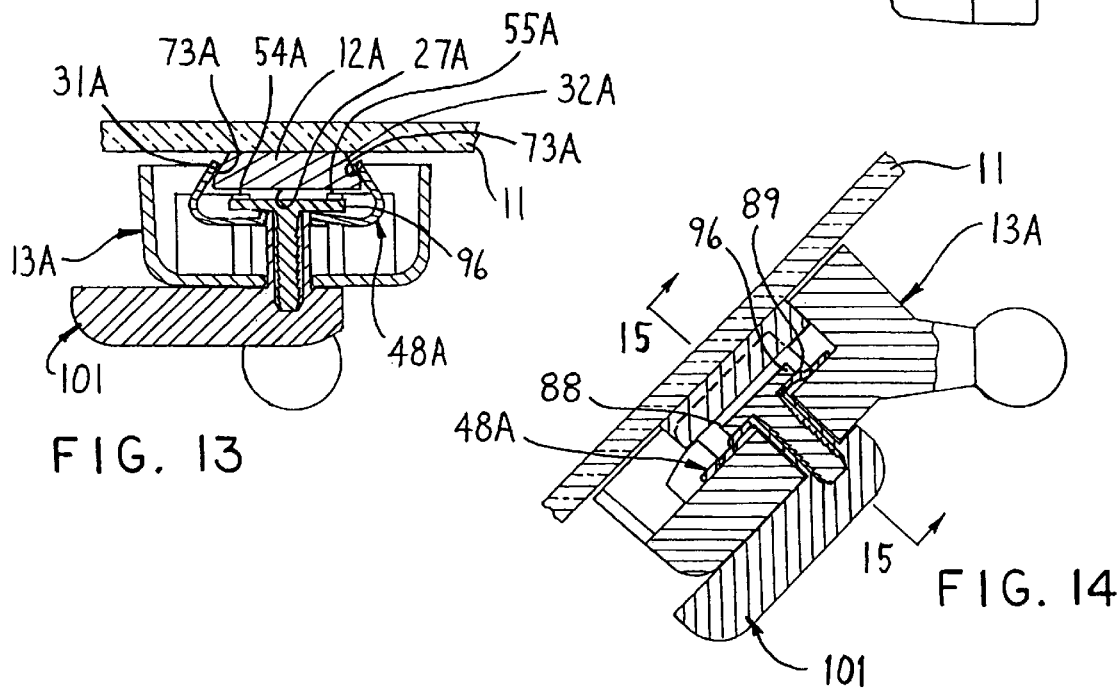
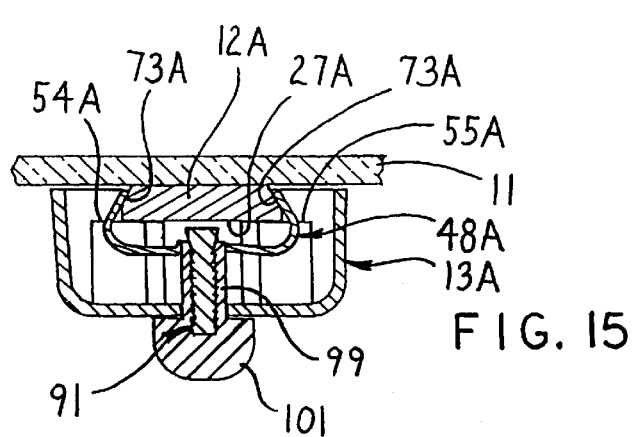

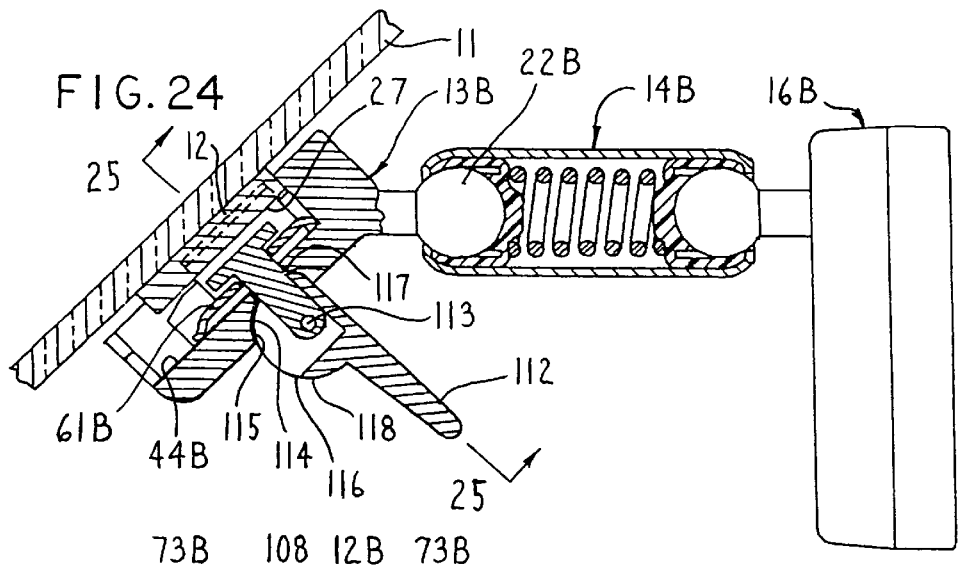
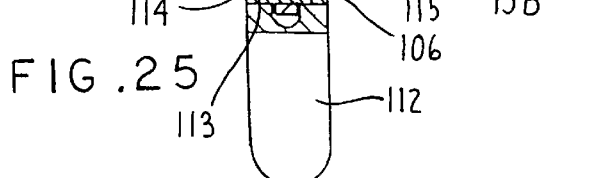
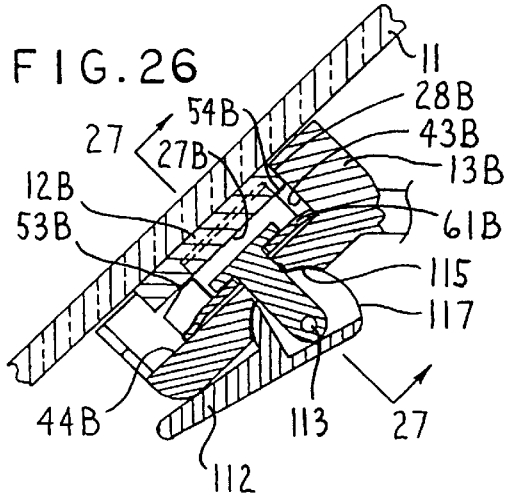
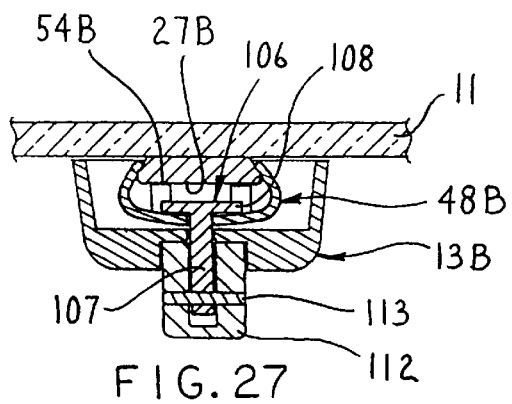

REGULATED ATTACHMENT FOR MIRROR MOUNT

BACKGROUND OF THE INVENTION

1. Field of the Invention

This invention relates to regulated attachment for interior rearview mirror assemblies mounted to a button on the interior of a vehicle windshield.

2. Scope of the Prior Art

Interior windshield-mounted rearview mirrors are commonly used in nearly all vehicles manufactured and sold throughout the world. Different mounts have been designed for different vehicles and are subjected to varying regulations of the different countries in which automobiles and similar vehicles are manufactured.

In the United States and Canada, for example, supports for conventional windshield-mounted rearview mirrors typically include a base member, known commonly as a "button", adhered to the inside of the windshield surface. The button has vertically disposed edges forming rails. The rails may be formed by a bevel on each edge. A support member, known in the industry as a "channel mount" is slidably fitted over the button whereby sides of the channel mount engage the rails of the button. The channel mount usually includes a mounting means such as an arm, ball joint, or other structure for suspending a rearview mirror in the vehicle compartment for use by the driver of the vehicle. A typical mounting assembly in U.S. vehicles includes a linkage with a double ball joint for adjusting the mirror relative to the windshield in a variety of positions.

Typically, the channel mount is retained on the button by the use of a set screw operatively engaging the button. However, the use of such a set screw has created numerous manufacturing and maintenance problems in the vehicle assembly. For example, set screws are typically purchased as low-priced commodity items with low tolerances in the screw threads. The inconsistency in such threads can result in cross threading of the screw in its aperture. Sometimes, automatic screwdrivers stop prematurely at a preset stall torque even though the support is not firmly tightened against the button. Sometimes the screws fit so sloppily that there is no torque. Also, the set screw is often stripped out by overtightening because of the improper sizing of the socket to the set screw or a weakness in the threads of the screw itself.

Attempts have been made in the past to design interior mirror mounts without the use of a set screw. An example may be found in U.S. Pat. No. 4,936,533 issued to Adams et al. on Jun. 26, 1990. This patent discloses a vehicle accessory mounting assembly comprising a spring retainer on the channel mount which is adapted to engage and grip an opposing, raised rib on the surface of the button. The Adams et al. design, however, presents some problems in that it requires a specially designed button and it is virtually impossible to disassemble without utilizing a special tool.

The U.S. Pat. No. to Aikens et al., 4,254,931, (issued Mar. 10, 1981) discloses an interior rearview mirror mount wherein a spring clip on a mounting member slides over a button on a windshield to provide a breakaway mount. The button has a plurality of serrations in an inner face thereof. The spring clip has a lock spring which engages the serrations to prevent easy sliding of the mounting member from the button. The Aikens et al. mount requires a special button which differs from buttons now in use. Further, the plurality of serrations may give a false and unregulated impression as to whether the mount is fully seated on the button.

Efforts to provide a regulated attachment for a rearview mirror were substantially enhanced by the spring clip construction disclosed in a U.S. Pat. No. to Suman et al, 5,377,948 (issued Jan. 3, 1995). Regulation of the securement is effected by a part of the die cast support or spring clip moving into a final assembled position with sufficient authority to signal the assembler that the support is fully seated on the button. The tolerance relationship between the spring clip and the button determines or regulates, based on the positional relationship between the spring clip and the button, the degree to which the support is fastened to the button. This construction revolutionized the assembly of a rearview mirror to a button by reason of providing a readily perceived signal to the installer that the integrity of the securement of the support to the button is to the required standard.

A need continues to exist for a regulated attachment mechanism for an interior rearview mirror mount which is easy for the installer to perform the required assembly, which is capable of retaining a mirror element in a stable position, is configured to be usable in the majority of vehicles which have varying windshield areas, angles of inclination, and radii of curvature, which will, if desired, readily break away from the button when subjected to an impact of predetermined magnitude, which is nevertheless readily removable for replacement, and which is aesthetically pleasing and capable of high-volume production at reduced manufacturing cost from that heretofore experienced and still provides consistent assembly time after time which meets the tolerance requirements and automobile safety standards.

SUMMARY OF THE INVENTION

The objects and purposes of the invention are met by providing a bracket assembly providing a regulated attachment of a support or bracket for a rearview mirror to a button. The button has a surface thereon secured to a surface of a vehicle windshield. The button further has lateral side surfaces facing away from each other and toward the windshield surface to define a groove therewith. The bracket includes a body member having a rearview mirror supporting structure thereon and a mounting for a spring clip. The spring clip includes an elongated base portion and longitudinally extending and laterally spaced resilient side flanges projecting from the base portion and away from the body member. Each of the side flanges extend substantially parallel to a respective side surface of the button and define a tongue adapted to be slidably received in a corresponding one of the aforesaid grooves in a tongue and groove fashion. The mounting for facilitating a connection of the spring clip to the bracket includes structure for loosely retaining the spring clip on the bracket and facilitate a free movement of the spring clip relative to the bracket so that the side flanges thereof are free to seek a parallel aligned orientation and full engagement with the side surfaces of the button in response to the body member moving relative to the button in an assembly direction to a position overlying the button. A manually activated tightening device is provided for forcible drawing the spring clip a regulated distance toward the body member to cause the side flanges to each be forcibly urged into tight engagement with the side surfaces of the button while maintaining the tongue-and-groove relationship therebetween as well as providing securement of the body member to the button.

BRIEF DESCRIPTION OF THE DRAWINGS

The invention will now be described with reference to the following drawings, in which:

FIG. 2 is a longitudinal sectional view through the windshield button and inventive bracket;

FIG. 3 is a longitudinal sectional view similar to FIG. 2 but wherein the bracket is overlaying the button;

FIG. 4 is a sectional view taken along the line 4—4 of FIG. 3;

FIG. 5 is a longitudinal sectional view similar to FIG. 3, but with the bracket fully seated on the button;

FIG. 6 is a sectional view taken along the line 6—6 of FIG. 5;

FIG. 10 is an exploded isometric view of a second embodiment of the invention;

FIG. 11 is an exploded isometric view of a lever construction for effecting a controlled and regulated securement of the spring clip onto the button;

FIG. 12 is a longitudinal sectional view through the button and the inventive bracket prior to the regulated securement;

FIG. 13 is a sectional view taken along the line 13—13 of FIG. 12;

FIG. 14 is a longitudinal sectional view through the button and the inventive bracket after the regulated securement;

FIG. 15 is a sectional view taken along the line 15—15 of FIG. 14;

FIG. 24 is a longitudinal sectional view through the button and the inventive bracket prior to the regulated securement;

FIG. 25 is a sectional view taken along the line 25—25 of FIG. 24;

FIG. 26 is a longitudinal sectional view through the button and the inventive bracket after the regulated securement;

FIG. 27 is a sectional view taken along the line 27—27 of FIG. 6;

DETAILED DESCRIPTION

Figure 1:
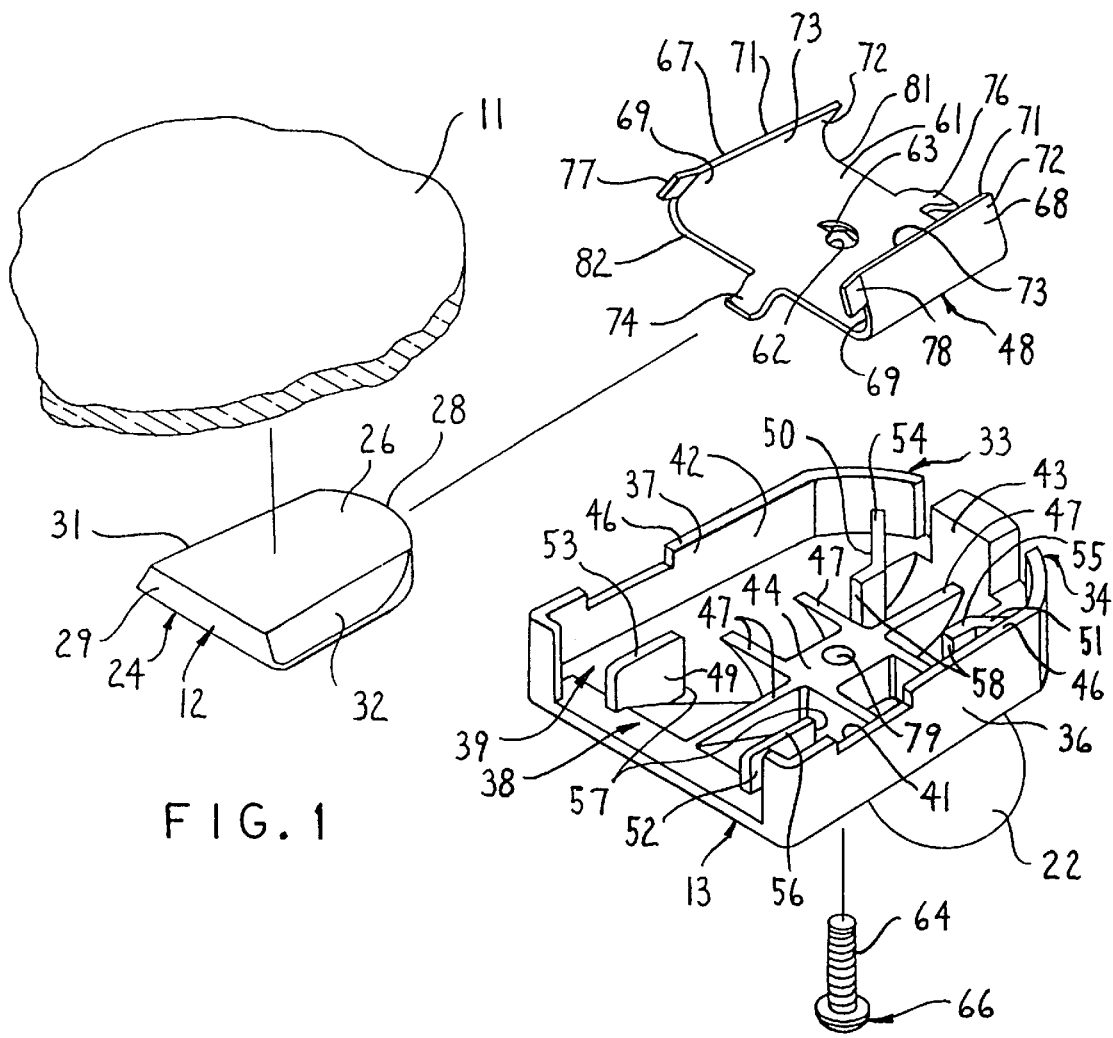
FIG. 1 is an exploded isometric view of a first embodiment of the invention.
Figure 7:
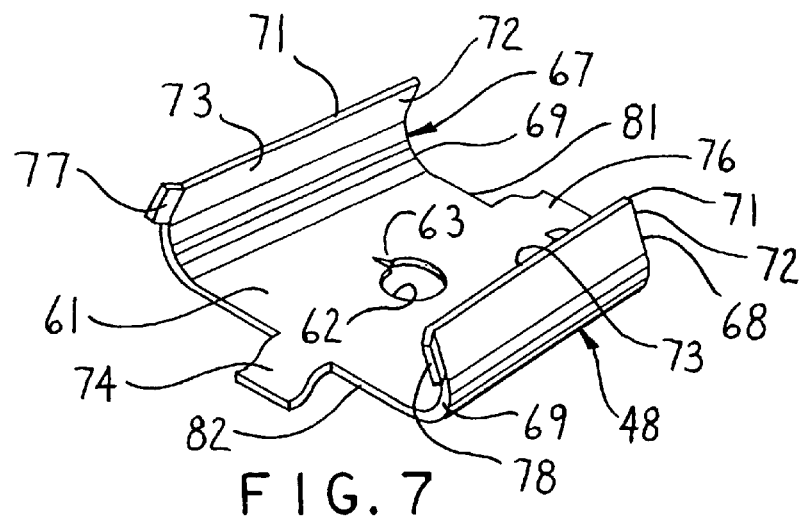
FIG. 7 is an isometric view of the inventive spring clip.
Figure 8:
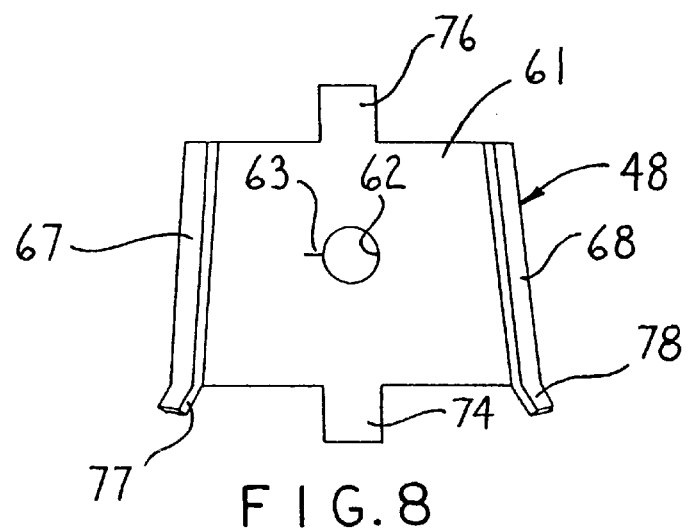
FIG. 8 is a top view of the spring clip.
Figure 9:
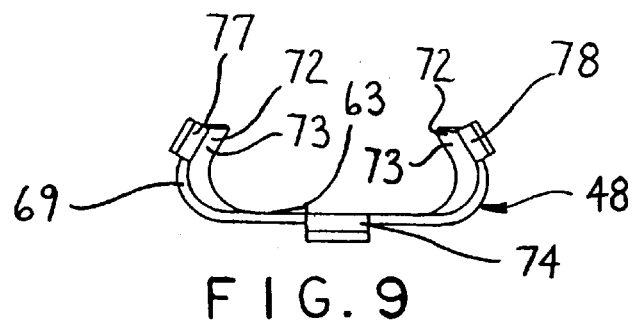
FIG. 9 is an end view of the spring clip.
Figure 16:
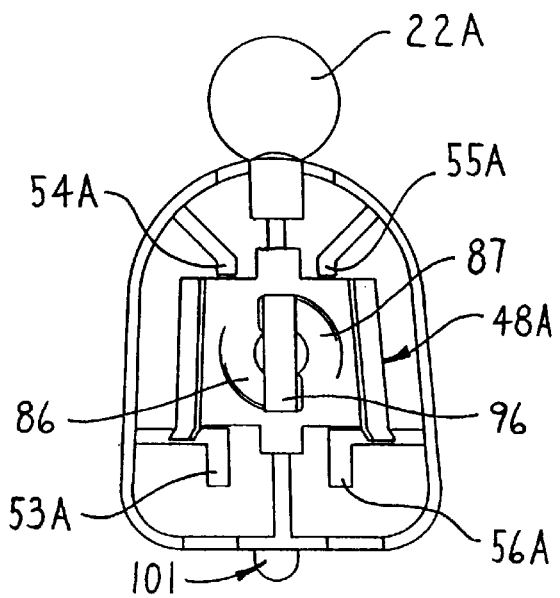
FIG. 16 is a front view of the bracket.
Figure 18:
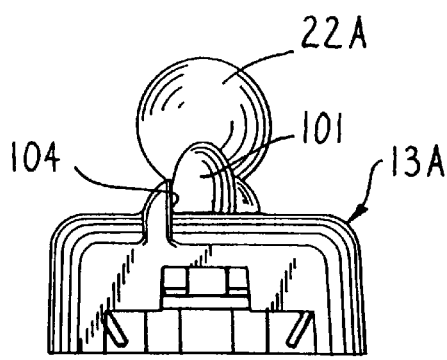
FIG. 18 is a bottom view of the bracket of FIG. 17.
Figure 19:
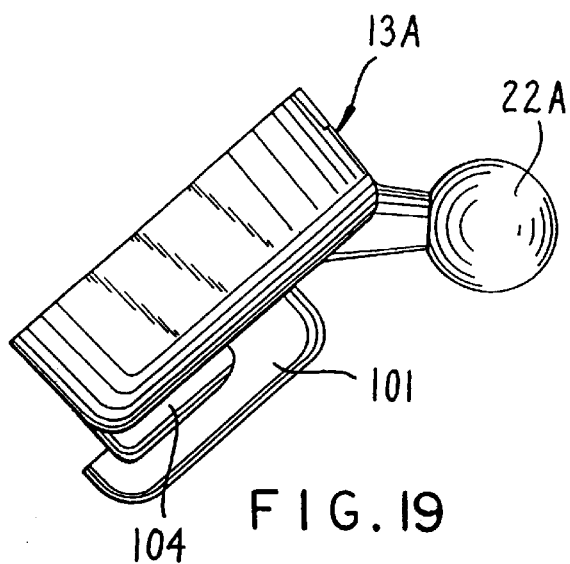
FIG. 19 is a side view of the bracket.

Certain terminology will be used in the following description for convenience in reference only and will not be limiting. The words "up" and "down", "right" and "left" will designate directions in the drawings to which reference is made. The words "in" and "out" will refer to directions toward and away from, respectively, the geometric center of the device and designated parts thereof. Such terminology will include derivatives and words of similar import.

Referring now to the drawings in greater detail, FIGS. 1–9 illustrate a first embodiment of a rearview mirror assembly 10 adapted to be mounted to the inside surface of a conventional automotive windshield 11. The windshield 11 is shown at a conventional slant to the horizontal, and it will be understood that the mirror assembly 10 is generally mounted on the inner surface thereof usually in about the transverse center of the windshield and forwardly of the occupants of the front seat. A base member 12, commonly known in the industry as a "button", is permanently adhered to the inner surface of the windshield 11 by means of a conventionally known metal to glass adhesive, such as polyvinyl butyryl, also known as PVB. A bracket 13, sometimes also known as a "channel mount" or "die cast piece" is slidably received over the button 12 and adjustably supports a rearview mirror mounting arm 14 (FIG. 3) and a rearview mirror 16 in cantilevered fashion such that they project into the vehicle passenger compartment for use by the vehicle driver. Although not forming any part of the present invention, a typical mounting arm 14 includes a swaged, one-piece tubular casing 17 enclosing a pair of plastic ball cups 18, 19 at each end thereof. The ball cups 18, 19 are forced outwardly by a compression spring 21 against the ends of the casing 17. A ball member 22 projects from the bracket 13 and is received in the ball cup 24. Similarly, a ball member 23 projects from the rearview mirror 16 and is received in the ball cup 19. It can be seen that the double ball joints of this structure provide a universal connection between the mirror 16 and the windshield 11 so that the driver may adjust it for its best rearview vision. It will further be understood that numerous variations for mounting the rearview mirror 16 to the bracket 13 are in common usage throughout the world, any one of which is easily adaptable for use with the bracket 13. For example, as is common in Europe, a single arm may project from the bracket 13 with a ball-and-socket connection on the end thereof connected directly with the rearview mirror 16.

Referring to FIGS. 1 and 2, the button 12 is typically an elongated body 24 preferably formed from sintered stainless steel, although other metals, plastics or other materials and other forming processes could also be used. The body 24 includes front and rear surfaces 26, 27, respectively, a top surface 28, a bottom surface 29, and oppositely facing side surfaces 31, 32. Typically, the top surface 28 is rounded or semi-circular and the side surfaces 31, 32 are flat and inclined relative to a longitudinal axis of the button extending from top to bottom so as to appear convergent. Also, the side surfaces 31, 32 are beveled or tapered toward the windshield as shown more clearly in FIGS. 4 and 6 so that the width of the rear surface 27 is greater than the width of the front surface 26. Each of the front and rear surfaces 26, 27 is substantially planar over its entire extent, the front surface 26 being adapted to be adhered by the conventionally known metal to glass adhesive, mentioned above, to the inside surface of the glass windshield 11. The bracket 13 comprises a one-piece body 33 from which the ball member 22 projects outwardly. The body 33 has a top end 34 which may be curved to roughly conform to the top surface 28 of the button 12 and has tapered sides 36, 37 terminating at an open end 38. The body 33 also includes an interior recess 39 which is bounded by side surfaces 41, 42, a top surface 43, and a mounting surface 44. The top surface 43 is dimensioned to conform to the top surface 28 of the button so that it functions as a stop member when the bracket 13 is mounted to the button. The aforesaid tapered side walls 36 and 37 terminate in windshield facing edges 46. The interior recess 39 includes a plurality of ribbing 47 which defines the aforesaid mounting surface 44 for a spring clip 48 which will be defined in more detail below. Additional ribbing 49, 50, 51 and 52 define button engaging surfaces 53, 54, 55 and 56, respectively. The ribs 49 and 52 as well as the ribs 50 and 51 have mutually facing surfaces 57 and 58 thereon between which the spring clip 48 is to be received. The purpose of this construction is to guide the spring clip during its movement which will be discussed in more detail below. The body 33, particularly the ribbing 47, also has a hole 79 extending therethrough, which hole is adapted to receive the shank of the screw 66 therein.

The spring clip 48 is formed from a single piece of spring steel, preferably of a thickness between 0.025 inches and 0.030 inches. The hardness of the steel is preferably within a range of 30 to 50 on the Rockwell C scale. The spring clip 48 includes a generally flat base portion 61 having a single opening 62 therein oriented centrally on the base portion. The sheet metal surrounding the opening 62 is configured to define a thread 63 adapted to threadedly engage the exterior thread 64 on a screw 66. A pair of elastically yieldable side walls 67, 68 extend upwardly from the lateral edges of the base portion 61 and are configured to converge at the same angle that the side surfaces 31, 32 converge. In this particular embodiment, each side wall 67, 68 has an upstanding portion 69 oriented generally perpendicularly to the plane of the base portion 61. The upper edge portion of each of the side walls 67, 68 terminate in an inwardly angled segment 72 (FIG. 9), the inwardly facing surface 73 thereof being adapted to engage the beveled, outwardly facing surfaces 31, 32 of the button 12. The inwardly facing surface 73 of each side wall 67, 68, when engaged with the outwardly facing surfaces 31, 32, are generally parallel to the outwardly facing surfaces 31, 32.

The spring clip 48 includes a resilient tab 74 and 76 projecting from the top and bottom, respectively, of the base portion 61 along the central longitudinal axis thereof. The resilient tabs 74 and 76 are each bent rearwardly from the plane of the base portion 61 so that they are oriented on a side of the aforesaid plane remote from the side walls 67, 68. The tabs 74 and 76 rest on the ribbing 47 of the body 33 of the bracket 13 in the assembled state. In addition, the bottom edge of each of the side walls 67, 68 adjacent the tab 74 each have an outwardly flared guide tab 77 and 78, respectively projecting therefrom.

As stated above, the shank of the screw 66 is received into the hole 79 and the exterior thread 64 thereof is threadedly engage with the thread 63 on the base portion 61 of the spring clip 48. The tabs 74 and 76 of the spring clip 48 rest on the ribbing 47 so as to effect a defined spacing of the base portion 61 away from the ribbing 47, also known as the mounting surface 44, as shown in FIGS. 2 and 3. Further, and without limiting the scope of the invention, the inwardly angled segments 72 may project outwardly from the recess 39 beyond the windshield facing edges 46. Thus, as the bracket 13 is moved with the aforesaid edges 46 closely align to the inside surface of the windshield glass 11 and toward the top surface 28 of the button 12, the segments 72 of each side wall 67, 68 will each engage a respective side wall 31, 32 of the button 12 to facilitate assembly of the spring clip 48 and bracket 13 on to the button 12. The guide tabs 77 and 78 facilitate this assembly. The assembly operation is best depicted by comparing FIG. 2 with FIG. 3. After the top surface 28 of the button 12 has abutted against the top surface 43 (FIG. 2) as shown in FIG. 3, the screw 66 can be rotated to draw the base portion 61 of the spring clip 48 toward the mounting surface 44 while simultaneously urging the button engaging surfaces 53, 54, 55 and 56 into engagement with the rear surface 27 of the button 12. The resilient tabs 74 and 76 will yield during this assembly until the base portion 61 engages the mounting surface 44, after which further rotation of the screw 66 is prevented. Since the initial spacing of the base portion 61 and the mounting surface 44 is regulated or controlled to a specified tolerance, turning the screw 66 until it cannot turn anymore causes the surfaces 73 on the side walls 67 and 68 of the spring clip 48 to be drawn into the recess 39 and into tight engagement with the side surfaces 31 and 32 of the button 12. The prevention of rotation of the screw 66 will be noted by the assembler and the assembler will note therefrom that the bracket 13 and associated spring clip 48 have been fully seated on the button 12. The mutually facing surfaces 57 and 58 on the additional ribbing 49, 50, 51 and 52 serve to retain the spring clip 48 therebetween prior to and during assembly when the spring clip 48 moves toward the mounting surface 44 controlled by the amount that the screw 66 is rotated relative to the spring clip 48. The same is true during disassembly. Sufficient clearance is provided between the top and bottom edges 81 and 82 of the base portion 61 to enable the spring clip to move as needed to sufficiently and effectively grip the side surfaces 31 and 32 of the button 12.

FIGS. 10–22 illustrate a second embodiment 10A of the invention. Identical components of this modified assembly 10A are identified by the same reference numerals as have been used above except that the suffix "A" has been added thereto. The button 12A is identical in configuration to the button described above and it is adapted to mount on the inside surface of the windshield in the same manner as has already been described. Further discussion of the components that are identical to the components described in the first embodiment is believed to be unnecessary.

The modified bracket 13A is similar in many respects to the bracket 13 described above. It has a mounting ball 22A thereon adapted to operatively cooperate with the mounting arm 14A and rearview mirror 16A in the aforesaid conventional manner. The bracket 13A also includes mounting surfaces 44A and ribbing 49A, 51A, 52A and 53A, each having a respective button engaging surface 53A, 54A, 55A and 56A. Further, the bracket 13A has a hole 79A extending therethrough.

A modified spring clip 48A is provided for this particular assembly. The spring 48A is, however, generally the same as the spring 48 except that the structure on the base portion 61A is different, particularly the structure surrounding the hole 62A. In this particular embodiment, a pair of arcuate ramps 86 and 87 are provided around the opening or hole 62A. The ramps terminate at the upper end in a respective landing surface 88 and 89 parallel to the base portion 61A.

A T-shaped clip 91 is provided and has a knurled or serrated exterior surface 92 on the shank 93 thereof as well as a longitudinally extending pair of ribs 94 on the shank which are diametrically spaced from one another, only one of which ribs 94 is shown in FIG. 11. The cross portion 96 of the T-shaped clip 91 is generally rectangular in configuration and has a landing surface 97 facing the serrations 92. The landing surface 97 can have a generally convex shape facing toward the serrations 92. The shank 93 of the T-shaped clip 91 is received into a correspondingly shaped hole 98 in the end of a cylindrical sleeve 99 which extends at a right angle to an elongated lever arm 101. The internal diameter of the hole 98 is less than the exterior diameter of the serrations 92 or height of the knurls. However, the serrations are yieldable so as to facilitate insertion of the shank 93 into the hole 98. The serrations 92 form a barb-like configuration once inserted into the hole 98 so as to prevent a removal of the T-shaped clip 91 from its engagement with the sleeve 99 on the lever 101. The diametrically opposed ribs 94 are received in respective elongated slots 102 and 103 inside the hole 98 and thereby prevent a relative rotation between the T-shaped clip 91 and the lever 101. The shank, prior to assembly, is inserted through the hole 62A in the spring clip 48A, the hole 79A of the bracket 13A and thence into the hole 98 of the sleeve 99 on the lever 101. This assembly is depicted in FIGS. 12–15.

In this particular embodiment, the longitudinal axis of the cross piece 96 of the T-shaped clip 91, when assembled to the lever 101 is aligned in the same direction as the longitudinal axis of the lever 101. Thus, when the longitudinal axis of the lever 101 is oriented in the broken line position illustrated in FIG. 17, the cross piece 96 will be oriented at the bottom end of the respective ramps 86 and 87 and the spring clip 48A will be urged by the resilient tabs 74A and 76A away from the mounting surface 44A as depicted in FIGS. 12 and 13. Further, the button engaging surfaces 53A, 54A, 55A and 56A will be spaced from the rear surface 27A of the button 12A as also depicted in FIGS. 12 and 13. However, upon a rotation of the lever 101 from the broken line position illustrated in FIG. 17 to the solid line position, the cross piece 96 will be moved through a 90° angle so as to ride up the respective ramps 86 and 87 until the cross piece rests on the landing surfaces 88 and 89 as depicted in FIG. 14. This action will resiliently urge the base portion 61A of the spring clip 48A toward the mounting surface 44A while simultaneously drawing the respective surfaces 73A of the spring clip 48A into secure and tight engagement with the side surfaces 31A and 32A of the button 12A. A stop surface 104 (FIG. 17) is provided so as to prevent the lever 101 from moving past the solid line position illustrated thereat.

Figure 17:
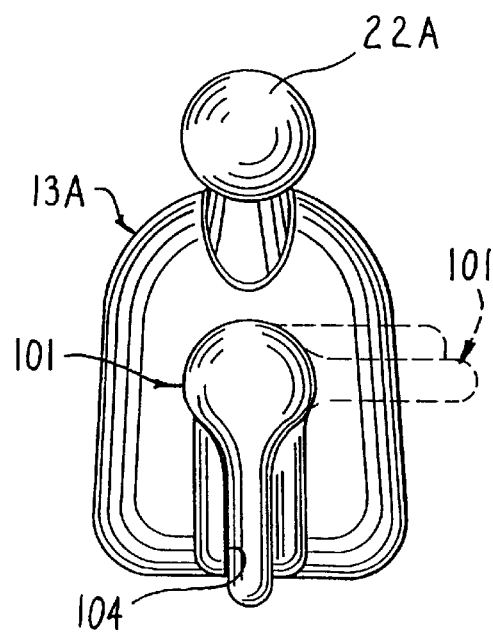
FIG. 17 is a rearview of the bracket.
Figure 17A:
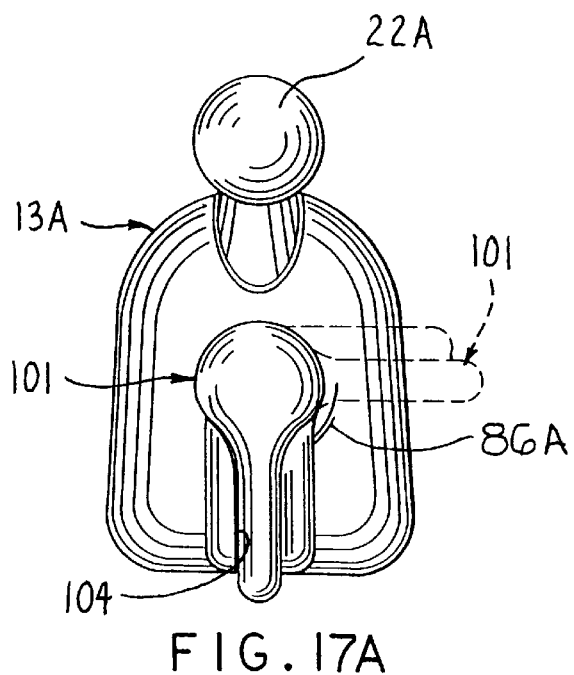
FIG. 17A is a rearview of a further modified bracket.
Figure 18A:
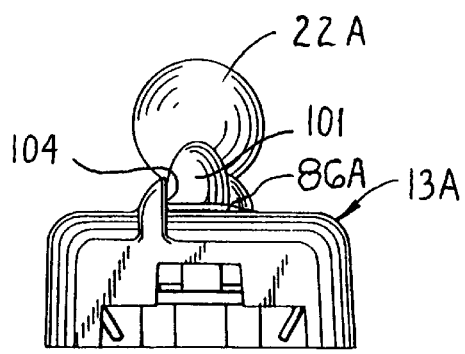
FIG. 18A is a side view of the modified bracket of FIG. 17A.
Figure 20:
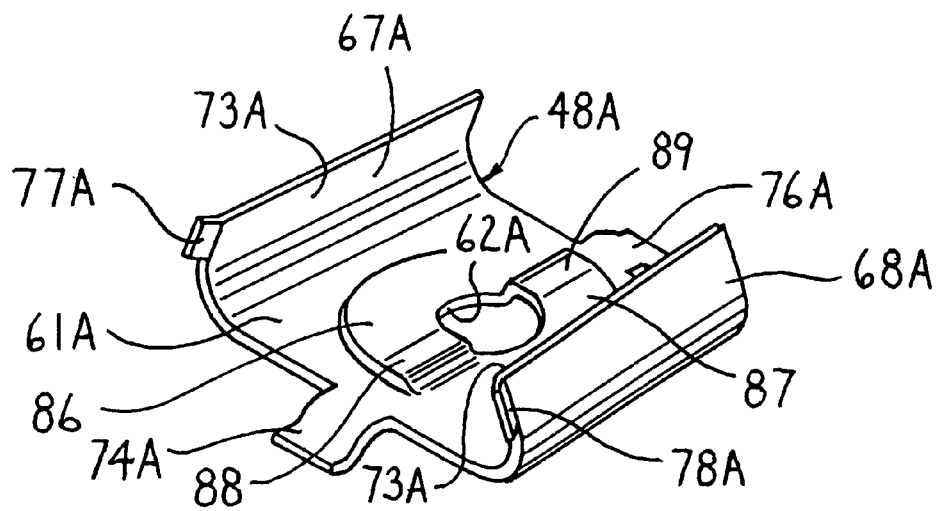
FIG. 20 is an isometric view of the spring clip of the second embodiment.
Figure 21:
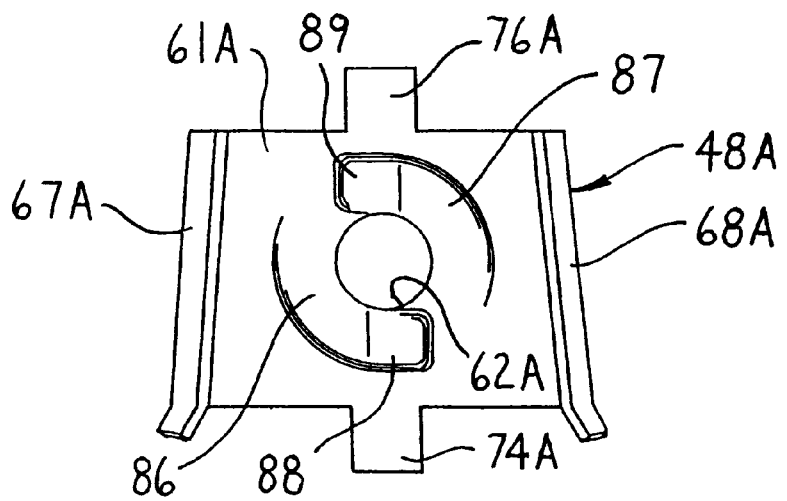
FIG. 21 is a top view of the spring clip of the second embodiment.
Figure 22:
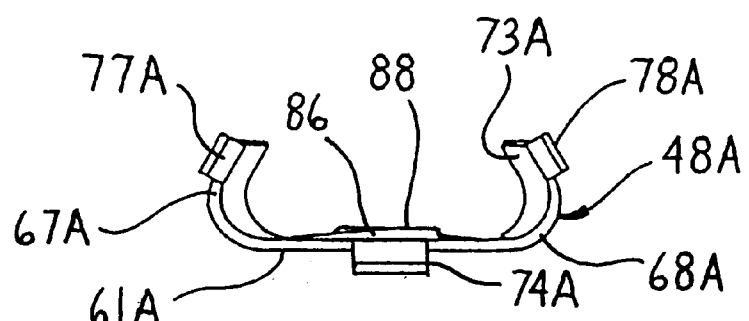
FIG. 22 is an end view of the spring clip of the second embodiment.
Figure 23:
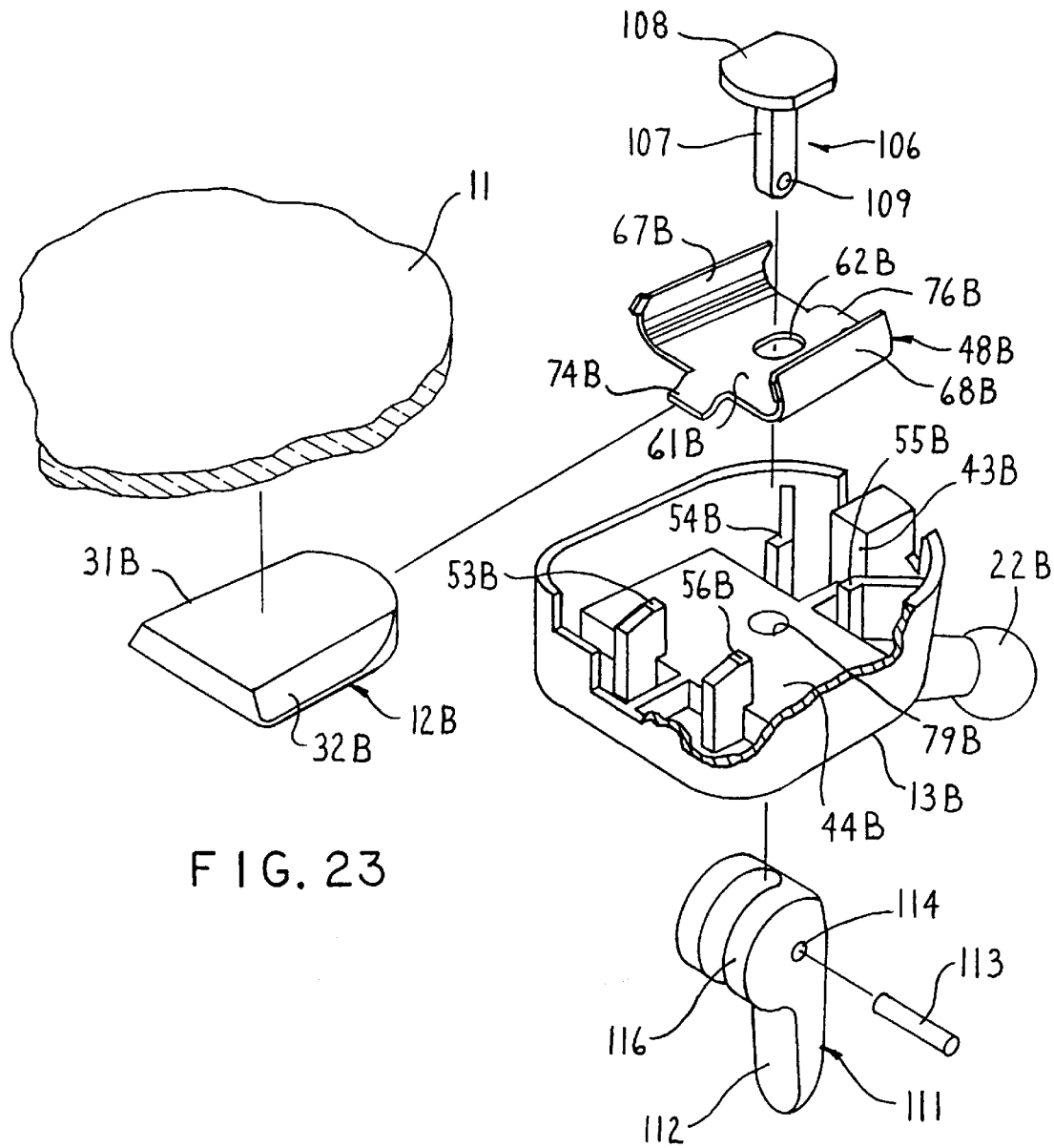
FIG. 23 is an exploded isometric view of a third embodiment of the invention.
Figure 28A:
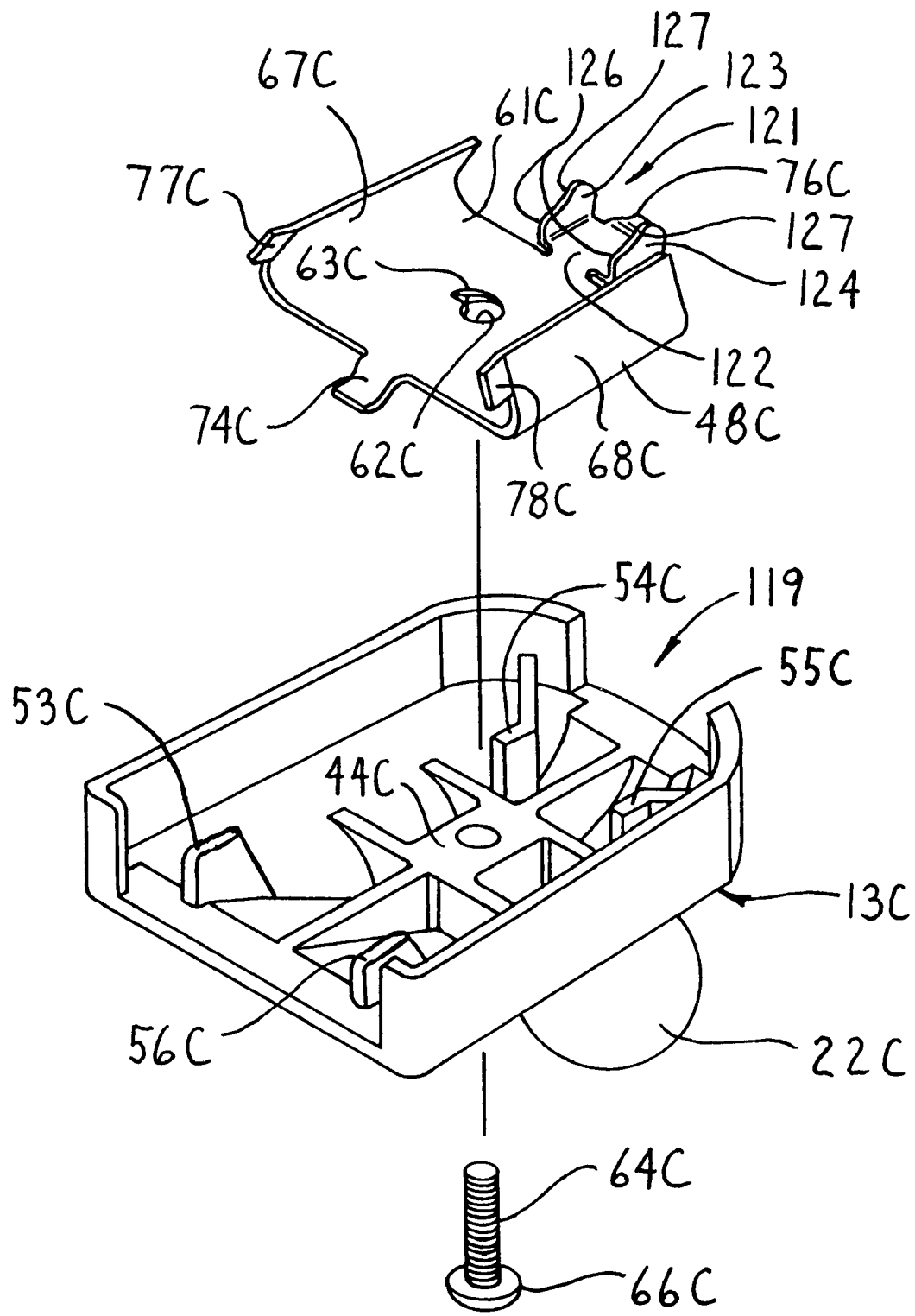
FIG. 28A is an exploded isometric view of an inventive bracket and spring clip constituting a fourth embodiment.
Figure 28B:
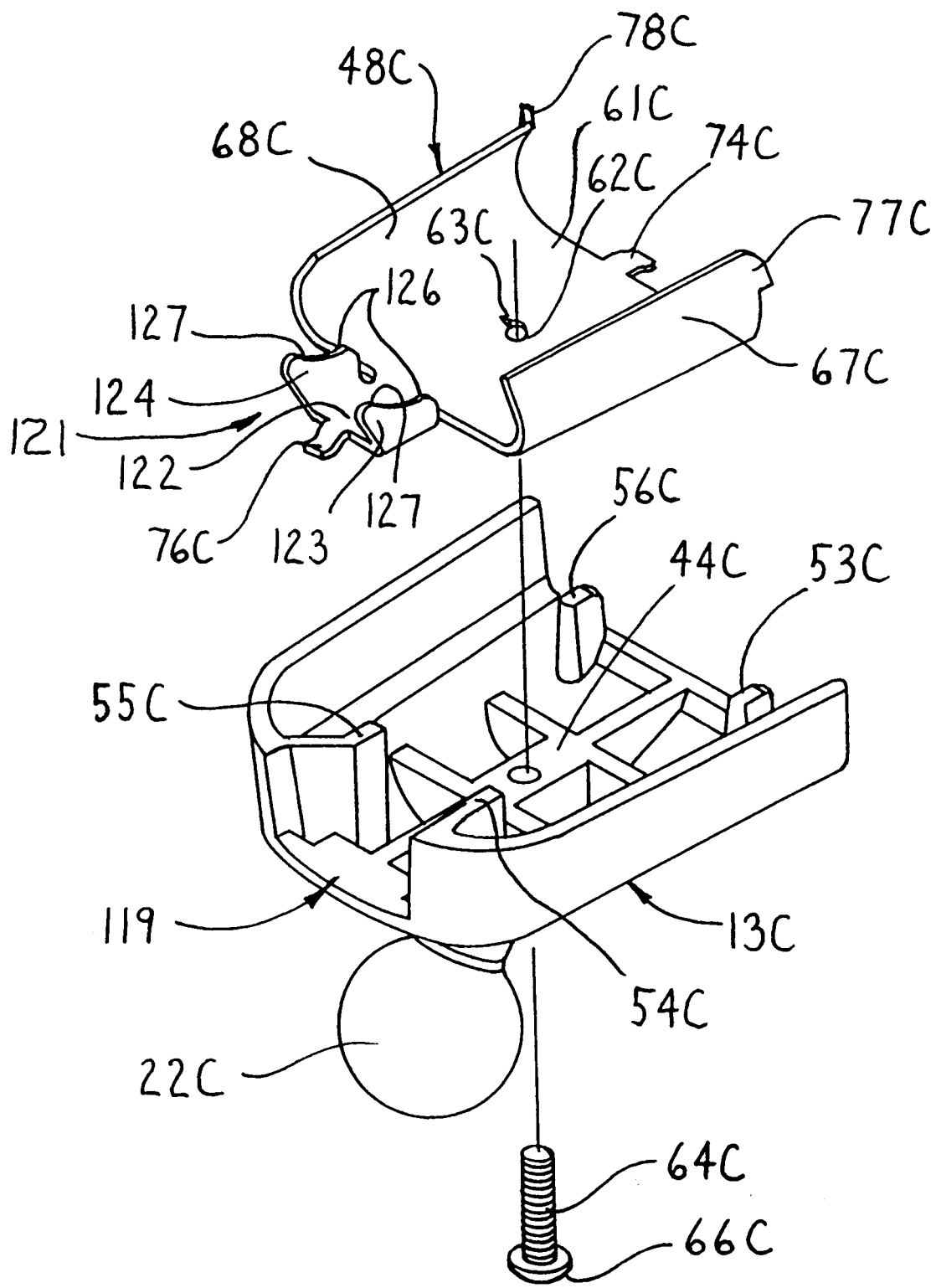
FIG. 28B is an exploded isometric view from the opposite end of FIG. 28A.
Figure 29:
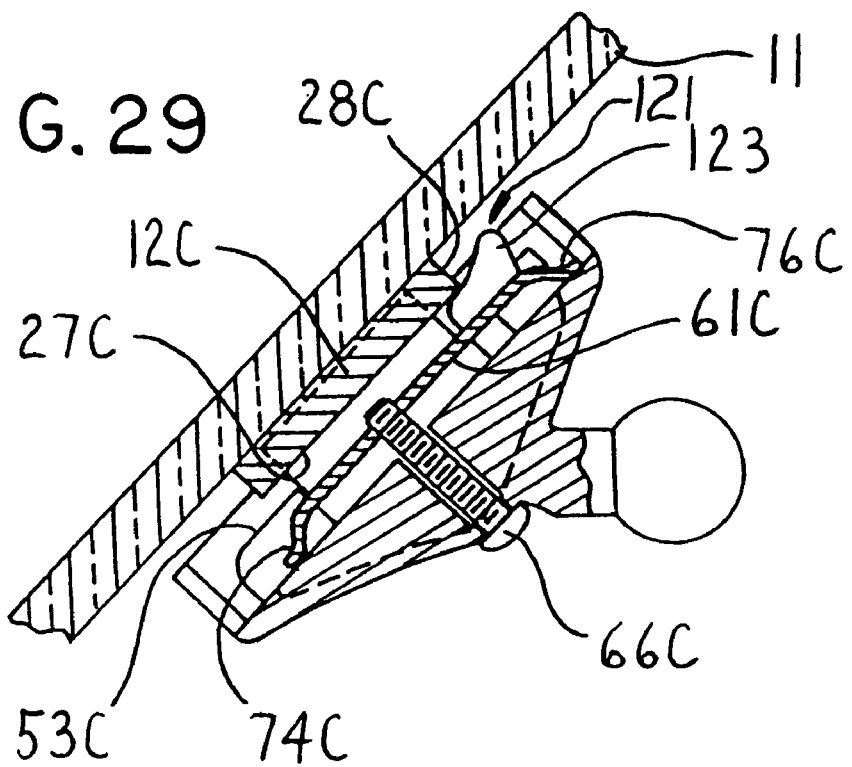
FIG. 29 is a longitudinal sectional view through the button and inventive bracket prior to the regulated securement.
Figure 30:
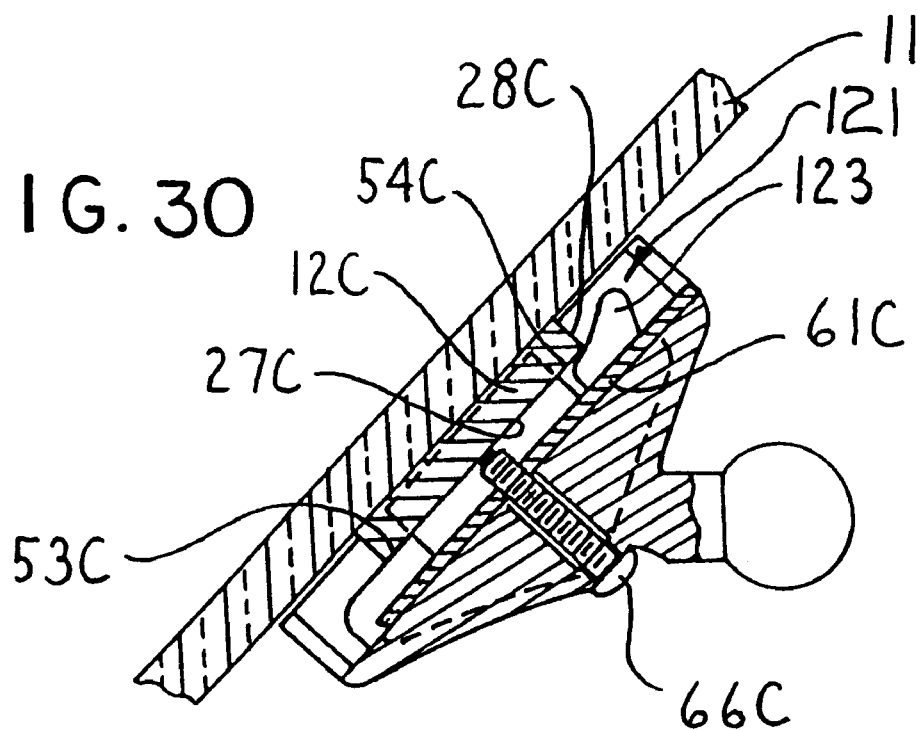
FIG. 30 is a longitudinal sectional view through the button and inventive bracket with the bracket being fully seated onto the button.

A further modified assembly similar to the preceding embodiment is shown in FIGS. 17A and 18A. Here, a ramp 86A is provided on a side of the body 13A remote the spring clip 48 or cross portion 96 of the clip 91 instead of using the ramp 86 on the spring clip 48. The lever 101 rides up the ramp 86A when it is turned from the broken line position to the said line position to draw the cross piece 96 toward the mounting surface 44A and to further cause the base portion 61A of the spring clip 48A to be urged toward the mounting surface 44A while simultaneously drawing the respective surfaces 73A of the spring clip 48A into secure and tight engagement with side surfaces 31A and 32A of the button 12A.

Referring now to the modified assembly 10B constituting a third embodiment illustrated in FIGS. 23–27, it will be noted that the button 12B retains the configuration described above as well as its mounting on the inside surface of the windshield 11. Identical components of this modified assembly 10B are identified by the same reference numerals as have been used in describing the first embodiment except that the suffix "B" has been added thereto. Thus, further description thereof is deemed unnecessary.

The modified spring clip 48B is similar to the spring clip 48 described above except that the hole 62B is elongated in a direction parallel to the side walls 67B, 68B. As a result, a further detailed description of the bracket 13B and spring clip 48B is deemed unnecessary.

In this particular embodiment, a T-shaped clip 106 is provided. The T-shaped clip 106 includes an elongated stem 107 extending away from an enlarged flat head cross piece 108. The cross piece 108 is not only wider than is the stem 107 but it is also longer than is the width of the stem 107. Thus, the T-shaped clip 106 has the general shape of a flat head nail. The stem portion 107 of the clip 106, at the distal end thereof, has a connecting assembly with rotational freedom, one such assembly being a hole 109 extending transversely therethrough. The stem 107 is adapted to be received through the hole 62B in the spring clip 48B and the hole 79B in the bracket 13B. A lever 111 is provided and includes an elongated lever arm 112 which is pivotally secured to the stem 107 by a pin 113. The pin 113 is received through a hole 114 in the lever arm 112 and through the hole 109 in the stem 107. The pin 113 is oriented on a side of the bracket 13B which is remote from the enlarged head 108 on the T-shaped clip 106 so as to retain the assemblage as shown in FIGS. 24–27. The modified bracket 13B includes a pocket 114 having an arcuate bottom wall 115. The lever arm 112 includes an arcuate bearing surface 116 which is received into the pocket 114 and slidingly engages the bottom wall 115 as shown in FIG. 24. The arch or curve of the bearing surface 116 is eccentric to the axis of the pin 113, the distance of the arcuate bearing surface 116 at an end 118 thereof from the axis of the pin 113 being greater than is the spacing of the arcuate bearing surface 116 to the axis of the pin 113 at the end 117 thereof. As a result, and when the elongated axis of the lever arm 112 is oriented generally perpendicular to the plane of the windshield 11 as shown in FIG. 24, the enlarged head 108 will be close to the rear surface 27 of the button 12 and spaced from the base portion 61B of the spring clip 48B.

When the lever arm 112 is moved to a position illustrated in FIG. 26, namely, generally parallel to the surface of the windshield 11, the end 118 of the bearing surface 116 will be received in the arcuate pocket 114 to effect a urging of the enlarged head 108 into engagement with the base portion 61B of the spring clip 48B to urge the base portion 61B toward the mounting surface 44B as is illustrated in FIGS. 26 and 27. The lever arm 112 may be further moved into a position slightly beyond parallel so as to secure the end 118 of the bearing surface 116 further into the arcuate pocket 114 thereby preventing an accidental movement of the lever arm due to the vibrations present in the vehicle. This movement will draw the surfaces 73B on the side walls 67B and 68B into tight engagement with the oppositely facing surfaces 31B and 32B of the button 12B. Such regulated movement will also inform the installer that the mounting bracket and the associated spring clip are seated fully on the button 12B. In addition, and when the lever arm 112 is in the position oriented generally perpendicular to the windshield depicted in FIG. 24, the side walls 67B and 68B will project from the bracket 13B so as to facilitate an easy orientation onto the side walls 31B and 32B of the button 12B during the assembly operation.

The embodiment illustrated in FIGS. 28A through 30 is similar to the first embodiment illustrated in FIGS. 1–9. Identical components of this modified assembly 10C are identified by the same reference numerals as have been used in describing the first embodiment except that the suffix "C" has been added thereto. The resilient tab 76 illustrated in FIGS. 1 and 7–9 has been replaced with a different construction for converting the bracket assembly 10C to a breakaway type bracket assembly. More specifically, a button rest construction 121 is interposed between the resilient tab 76C and the base portion 61C. The button rest construction 121 includes a base part 122 contiguous with the base portion 61C. The base part 122 has a pair of laterally spaced and upstanding side wall portions 123 and 124 contiguous therewith. The upper edges of each of the side walls 123 and 124 terminate in first and second edge surface portions 126 and 127 extending inclined relative to the plane of the base portion 61C and base part 122. Specifically, each first edge surface 126 on each side wall 123 and 124 extends in a generally upwardly inclined relation to the plane of the base portion 122 at an angle generally in the range of 10° to 30°. Each second edge surface 127 extends inclined further upwardly from the first edge surface 126 and at an angle that is generally approximately in the range of 140° to 160° to the surface 126. The bracket 13C has been modified to eliminate the stop. In its place is provided a gap 119 into which is received the aforesaid button rest construction 121.

A screw 66C and its thread 64C is operatively engaged with the thread 63C on the base portion 61C of the spring clip 48C to draw the spring clip toward the mounting surface 44C of the bracket 13C in the same manner as has been described above with respect to the embodiment of FIGS. 1–9. The embodiment illustrated in FIGS. 28A–30 may also be adapted for use with the lever lock embodiment (FIGS. 23–27) and the twist lock embodiment (FIGS. 10–22) by appropriately adapting the lever lock assembly or the twist lock assembly into the embodiment of FIGS. 28A through 30. Specifically, the button rest configuration 121 would be substituted into any of the embodiments in place of the resilient tabs 74, 76, 74A, 76A, 74B, 76B, 74C, 76C. Further commentary concerning this construction is, therefore, believed unnecessary.

Reference to the teachings in U.S. Pat. No. 5,377,948, mentioned above, are to be incorporated herein by reference. From this reference, it will be readily understood that the above described spring clips all effect not only a securement of the respective body members to the respective buttons, but also the securement will be detachable, that is, the spring clips all can be snapped off from the buttons in a direction away from the windshield when a force of predetermined magnitude is applied to the respective body members.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an attachment for mounting a rearview mirror to a button having a first surface thereon secured to a surface of a vehicle windshield and lateral side surfaces facing away from each other and toward said windshield to define a groove therewith, said attachment including:
   a body member having a rearview mirror supporting means thereon;
   resilient means and mounting means therefor for mounting said resilient means on said body member, said resilient means including gripping means for gripping and securing said body member to said button, said gripping means further including an elongated base portion and longitudinally extending and laterally spaced resilient side flanges projecting from said base portion and away from said body member, each of said side flanges being adapted to extend generally parallel to a respective said side surface of said button and defining a tongue adapted to be slidably received in a corresponding one of said grooves in a tongue-and-groove fashion;

the improvement wherein said mounting means includes means for loosely retaining said resilient means on said body member so that said side flanges thereof are freely adapted to seek a parallel aligned orientation and full engagement with said side surfaces on said button in response to said body member moving relative to said button in an assembly direction to a position overlying said button; and
selectively manually activated tightening means for forcibly drawing said resilient means a regulated distance toward said body member to cause said side flanges to each be forcibly urged into tight engagement with said side surfaces of said button while maintaining said tongue-and-groove relationship therebetween as well as providing securement of said body member to said button.

2. The attachment according to claim 1, wherein said body member and said resilient means are separate components from one another; and
   wherein said selectively manually activated tightening means is provided between said body member and said base portion on said resilient means to cause, when activated, relative movement between said base portion and said body to thence urge said side flanges toward one another into tight engagement with said side surfaces on said button.

3. The attachment according to claim 2, wherein said body member has plural button support surfaces thereon opposing said base portion of said resilient means, wherein said selectively manually activated means includes means defining a first hole through said body member, an axis of said first hole being generally perpendicular to a plane containing said base portion, means defining an internally threaded second hole in said base portion aligned with said first hole in said body member, and an externally threaded screw received in both of said first and second holes and threadedly engaging said internal thread, whereby a selective rotating of said screw will draw said base portion of said resilient means said regulated distance toward said body member at least until said button support surfaces engage said button, continued movement of said resilient means effecting a tensioning of said resilient means.

4. The attachment according to claim 2, wherein said body member has plural button support surfaces thereon opposing said base portion of said resilient means, wherein said selectively manually activated means includes means defining a hole through said body member, an axis of said hole being generally perpendicular to a plane containing said base portion, means defining a second hole in said base portion aligned with said first hole in said body member, a generally T-shaped member having a head part and an elongated stem, said stem being received in both of said first and second holes, said head being oriented on a side of said base portion remote from body member, and manually operated drive means for effecting a forcible movement of said head toward said body member so as to draw said base portion of said resilient means said regulated distance toward said body member.

5. The attachment according to claim 2, wherein said body member has plural button support surfaces thereon opposing said base portion of said resilient means, wherein said selectively manually activated drive means includes a lever and pivot means for pivotally securing said lever to said stem on a side of said body member remote from said head, said lever having an arcuate surface thereon eccentric to a pivot axis of said pivot means, said arcuate surface engaging a surface on said body member so that as said lever is pivoted about said pivot axis of said pivot means between first and second positions thereof, said arcuate surface will cause said pivot axis to move away from said body member to thereby draw said head toward said body member and thence said base portion of said resilient means said regulated distance toward said body member.

6. The attachment according to claim 2, wherein said body member has plural button support surfaces thereon opposing said base portion of said resilient means, wherein said selectively manually activated drive means includes a lever and means for securing said lever to said stem on a side of said body member remote from said head, wherein said stem is rotatably supported and axially stationary on said body member, wherein said base portion of said resilient means on a side thereof facing said head, has inclined ramp means slidingly engaged by said head, whereby as said stem is rotated, said head will slide on said inclined ramp means to cause said base portion of said resilient means to be forcibly drawn said regulated distance toward said body member.

7. The attachment according to claim 1, wherein said selectively manually activated means includes means defining a first hole through said body member, an axis of said first hole being generally perpendicular to a plane containing said base portion, means defining an internally threaded second hole in said base portion aligned with said first hole in said body member, and an externally threaded screw received in both of said first and second holes and threadedly engaging said internal thread, whereby a selective rotating of said externally threaded screw will effect a drawing of said base portion of said resilient means said regulated distance toward said body member.

8. The attachment according to claim 1, wherein said selectively manually activated means includes means defining a first hole through said body member having an axis generally perpendicular to a plane containing said base portion, means defining a second hole in said base portion aligned with said first hole in said body member, a generally T-shaped member having a head part and an elongated stem, said stem being received in both of said first and second holes, said head being oriented on a side of said base portion remote from said body member, and manually operated drive means for selectively effecting a forcible movement of said head toward said body member so as to effect a effect of drawing of said base portion of said resilient means said regulated distance toward said body member.

9. The attachment according to claim 8, wherein said manually operated drive means includes a lever and pivot means for pivotally securing said lever to said stem on a side of said body member remote from said head, said lever having an arcuate surface thereon eccentric to an axis of said pivot means, said arcuate surface engaging a surface on said body member so that as said lever is pivoted about said axis of said pivot means between first and second positions thereof, said arcuate surface will cause said pivot axis to move away from said body member to thereby draw said head toward said body member and thence said base portion of said resilient means said regulated distance toward said body member.

10. The attachment according to claim 8, wherein said manually operated drive means includes a lever and means for securing said lever to said stem on a side of said body member remote from said head, wherein said stem is rotatably supported and axially stationary on said body member, wherein said base portion of said resilient means on a side thereof facing said head, has inclined ramp means slidingly engaged by said head, whereby as said stem is rotated, said head will slide on said inclined ramp means to cause said base portion of said resilient means to be forcibly draw said regulated distance toward said body member.

11. The attachment according to claim 1, wherein said manually operated drive means includes a lever and means for securing said lever to said stem on a side of said body member remote from said head, wherein said stem is rotatably supported and axially movable on said body member, wherein said side of said body member remote from said lease portion has inclined ramp means slidingly engaged by said lever, whereby as said stem is rotated, said lever will slide on said inclined ramp means to cause said base portion of said resilient means to be forcibly drawn said regulated distance toward said body member.

12. The attachment according to claim 1, wherein said securement of said body member to said button is a detachable securement enabled by said side flanges snapping off said button in a direction away from said windshield in response to a force of predetermined magnitude is applied to said body member.

* * * * *

UNITED STATES PATENT AND TRADEMARK OFFICE
CERTIFICATE OF CORRECTION

PATENT NO. : 5 931 440
DATED : August 3, 1999
INVENTOR(S) : Jeffrey A. MILLER

It is certified that error appears in the above-identified patent and that said Letters Patent is hereby corrected as shown below:

Column 11, lines 43 and 44; change "to effect a effect
   of drawing of said base portion" to
   ---to effect a drawing of said base portion---.
Column 12, line 26; change "according to claim 1" to
   ---according to claim 8---.
Column 12, line 32; change "lease portion" to
   ---base portion---.

Signed and Sealed this

Twenty-eighth Day of March, 2000

Attest:

Q. TODD DICKINSON

Attesting Officer

Commissioner of Patents and Trademarks